United States Patent Office 2,922,938
Patented Jan. 26, 1960

2,922,938

ELECTRIC CAPACITOR AND STABILIZED DIELECTRIC MATERIAL THEREFOR

Joseph E. Petley, Troy, N.Y., assignor to General Electric Company, a corporation of New York No Drawing. Application June 24, 1954
Serial No. 439,162

6 Claims. (Cl. 317—259)

The present invention relates to dielectric compositions. More particularly, the present invention relates to the stabilization of silicone compounds used as dielectric liquids or impregnants in such devices as capacitors, transformers, cables, switches, fuses, reactors, circuit breakers, and similar electrical equipment.

The dielectric liquids which may be stabilized in accordance with the invention include silicone oils, and, in particular, alkyl and aromatic organo-siloxanes. Organo-siloxanes are compositions having silicon atoms joined together by oxygen atoms through silicon-oxygen linkages thus,

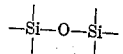

and having organic radicals attached by carbon-silicon linkages to at least some of the silicon atoms. Organo-siloxanes have been found particularly desirable as dielectric liquids since they are in general non-hydrolyzable, substantially non-hygroscopic and generally maintain their electrical characteristics under conditions in which other types of dielectric liquids break down. However, it has been noted that the organo-siloxanes tend to lose their good electrical insulating properties under conditions of elevated temperature and chemical and electrochemical action such as occurs in the use of these compounds in electrical devices of the above type, and especially in capacitors. Under these conditions, the organo-siloxane compounds are particularly susceptible to deterioration, which often leads to premature breakdown of the electrical device in which they are used, as, for example, the short circuiting of a capacitor.

It is, therefore, an object of the present invention to stabilize dielectric liquids, particularly those of organo-siloxane composition, against deterioration and breakdown.

It is another object of the invention to prevent changes in the properties of organo-siloxanes due to thermal, chemical, and electrochemical influences.

The silicone compounds which may be stabilized in accordance with the invention include both alkyl and aromatic organo-siloxanes. Such organo-siloxanes include compounds having organic radicals attached to the silicon atom through carbon-silicon linkage. Examples of such organic radicals are as follows: aliphatic radicals such as methyl, ethyl, propyl, isopropyl, butyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di-, and tri-ethyl phenyls, mono-, di-, and tri-propyl phenyls, etc.; naphthyl, mono- and poly-alkyl naphthyls as methyl naphthyl, diethyl naphthyls, tri-propyl naphthyl, etc.; tetra-hydronaphthyl, anthracyl, etc.; aralkyl such as benzyl, phenyl-ethyl, etc.; alkenyl such as methallyl, allyl, etc., and heterocyclic radicals. The above organic radicals may also, if desired, contain inorganic substituents such as halogens, etc. Examples of such organo-siloxanes which have proved particularly suitable are methyl siloxane, ethyl siloxane, propyl siloxane, amyl siloxane, phenyl methyl siloxane, phenyl ethyl siloxane, and derivatives thereof.

Stabilizers of the present invention are especially effective when used in siloxanes which have an average of approximately one to approximately two organic radicals per silicon atom. Such liquid organo-siloxanes when used as dielectric liquids in closed containers, and especially in hermetrically sealed capacitors such as tested under the conditions described in the examples set forth below, are particularly subject to thermal, chemical and electrochemical degradation and undesirable changes in electrical properties resulting therefrom.

In accordance with the invention, it has been found that certain types of organic compounds, and in particular certain ketone compounds, when added in relatively small quantities to silicone oil dielectric liquids prolong to an unexpected degree the life of such dielectric liquids and the operative life of the devices in which they are used. Compounds of this type which have proved particularly useful and effective in stabilizing organo-siloxane dielectric liquids include anthraquinone and derivatives thereof, such derivatives including beta chlor anthraquinone, beta methyl anthraquinone, quinizarine, beta amino anthraquinone, and 2-tertiary butyl anthraquinone. Other aliphatic groups such as the dodecyl group can be substituted at the alpha and/or beta positions of anthraquinone to provide useful stabilizing additives in accordance with the invention.

Another group of effective stabilizers for the organo-siloxane dielectric liquids was found to be the aromatic-aliphatic mono-ketones. This group can be represented by:

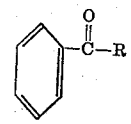

where R may be methyl, ethyl, and long chain aliphatic substituents. For example, propiophenone has been found suitable.

A further group of compounds which has been found to be of particular value in stabilizing liquid organo-siloxanes against thermal and electrochemical breakdown are the unsaturated and aryl-alkenyl ketones. Especially suitable in this group is dypnone, $C_{16}H_{14}O$, a condensation product of two molecules of acetophenone. Dypnone is, in addition, effective for inhibiting deleterious effects caused by ultra violet rays which may be transmitted to the dielectric liquid in a sealed container, such as a capacitor, through translucent bushings or the like. Other examples of useful stabilizers for organo-siloxanes which are in this group are phorone, mesityl oxide, benzal acetone, dibenzal acetone, difurfural acetone, isophorone, butylidene acetone, methyl vinyl ketone, and benzal acetophenone.

A further group of compounds which have been found valuable in stabilizing and prolonging the life of organo-siloxanes, particularly when used as dielectric liquids in electrical devices of the above-mentioned types, is that of the heterocyclic ketones, and of this group beta methyl umbelliferone, also known as resocyanine, has proved especially effective. Another example of this group is coumarin.

It is preferable in accordance with the invention to use the above described stabilizer substances as additives in traces or very small amounts in the silicone oils which serve as the dielectric liquids. Specifically, it is found that amounts of these stabilizer substances in the range of 0.01–5% by weight based on the dielectric liquid are desirable and effective. In particular, the addition of stabilizer substances in the range of 0.05–1.5% by weight has proved exceptionally satisfactory.

The results given in the following examples were obtained in the process of testing the various stabilizer compositions mentioned above in determining their stabilizing properties, particularly with respect to the comparative length of life of the dielectric liquid when subjected to thermal, chemical, electrochemical and other influences prevailing in the use of the thus stabilized dielectric liquid in a capacitor. In these experiments capacitors were used having the following design: 3 sheets of 0.0004" kraft paper with a 0.00025" aluminum foil electrode, and with effective area of 7.78 sq. ft. having a nominal capacity of approximately 0.76 mfd.

It is to be understood that the following examples are given for the purpose of illustration only and are not to be interpreted as limiting the scope of the invention in any way.

Example I

In this example an unstabilized silicone oil composed of dimethyl siloxane in a number of capacitors was tested by subjecting the capacitors first to 1500 volts D.C. (hereinafter designated v. D.C.) at 85° C., and under these conditions the average life of the capacitor was found to be 608 hours. When tested at 1000 v. D.C. at 125° C. the average life of the capacitors with the same composition of unstabilized silicone oil therein was less than 101 hours.

Example II

A number of capacitors having a dielectric liquid impregnant of dimethyl siloxane incorporating 0.1% by weight of anthraquinone were tested at 1500 v. D.C. and 85° C., the average life of the capacitors under these conditions being found to be 3701 hours. Capacitors having the same stabilized siloxane composition when tested at 1000 v. D.C. and 125° C. were found to have an average life of 2171 hours.

Example III

A series of capacitors were subjected to a life test, the capacitors having an insulation impregnant composed of dimethyl siloxane having an additive therein of 0.1% propiophenone. The capacitors were operated at 1500 v. D.C. at 85° C., and under these conditions it was found that the average life of the capacitors tested was 4971 hours. When a group of capacitors having the same composition of insulation impregnant were subjected to 1000 v. D.C. at 125° C., the average life was found to be 821 hours.

Example IV

Three capacitors having a dielectric liquid therein composed of dimethyl siloxane and 0.1% beta chlor anthraquinone were subjected to a life test temperature of 85° C. and 1500 v. D.C., and the average life of the capacitors was found to be 3379 hours. A group of capacitors having the same composition of dielectric material when tested at 125° C. and 1000 v. D.C. lasted an average of 1206 hours.

Example V

Similar tests at the corresponding temperatures and voltages as in the preceding examples were made on a number of capacitors having as a dielectric composition dimethyl siloxane and 0.1% beta methyl anthraquinone, and in the respective life tests the average life of the capacitors was 3581 hours at 85° C. and 1500 v. D.C., and 2526 hours at 125° C. and 1000 v. D.C.

Example VI

Similar tests as above were carried out on capacitors having dimethyl siloxane and 0.1% quinizarine as the dielectric compound, and in these tests the average life of the capacitors was found to be 7579 hours and 2084 hours, respectively.

Example VII

Tests were made on capacitors having dimethyl siloxane and 0.1% of beta amino anthraquinone as a stabilized dielectric liquid under corresponding temperatures and potential as above, and the average life of the capacitors in these tests was found to be 1821 hours and 910 hours, respectively.

Example VIII

Three capacitors having a dielectric liquid composed of dimethyl siloxane and a stabilizer of 0.05% of beta methyl umbelliferone were tested at 85° C. and 1500 v. D.C., and of the three capacitors, one was found to have a life of 1025 hours, one lasted for 2217 hours, and the third was still in satisfactory operating condition after 8282 hours. A similar number of capacitors tested at 125° C. and 1000 v. D.C. was found to have an average life of 1395 hours.

Example IX

A series of capacitors was tested using a dielectric insulation composition of dimethyl siloxane with a stabilizer of 0.1% of 2-tertiary butyl anthraquinone, the two testing conditions as in the above examples prevailing. The life of these capacitors was found to be, on an average, 5204 hours and 3292 hours, respectively, under the two testing conditions.

Example X

In two corresponding accelerated life tests of three capacitors having a dielectric of dimethyl siloxane plus an additive of 0.5% dypnone, after 5280 hours during which the capacitors were treated under the conditions of 1500 v. D.C. and 85° C., all three of the capacitors were found to be in satisfactory operating condition. When a similar number of capacitors having the same composition of dielectric incorporated therein were tested at 125° C. and 1000 v. D.C., the results showed that one of the capacitors lasted for 1526 hours, a second capacitor lasted for 3167 hours, and the remaining capacitor after 4911 hours was still operating.

While the invention has been described with specific reference to particular compounds used in combination with organo-siloxane dielectric liquids, it is to be understood that it is not restricted to the recited compounds. For example, other compositions within the classes of chemical compounds mentioned above may be used in accordance with the invention without departing from the spirit or scope of the invention.

Further it is to be understood that while the silicone oils or organo-siloxanes referred to herein have been found particularly suitable for use as dielectric liquids, they are not restricted to such use and may be utilized within the scope of the invention for other purposes and applications. For example, silicone oils stabilized in accordance with the invention may be useful as hydraulic fluids for transmission of pressure, as damping media, and as lubricants, especially where subject to unusual thermal, chemical and electrochemical conditions.

What I claim as new and desire to secure by Letters Patent of the United States is:

1. An electric capacitor comprising, in combination, a hermetically sealed container, a pair of metal electrodes and a paper spacer therebetween in said container, said paper spacer being impregnated with a dielectric liquid consisting essentially of an organo-siloxane and about .01–5% by weight of a ketone selected from the group consisting of anthraquinone and derivatives thereof, propiophenone, dypnone, and beta methyl umbelliferone.

2. The device as defined in claim 1, wherein the ketone is anthraquinone.

3. The device as defined in claim 1, wherein the ketone is beta chlor anthraquinone.

4. The device as defined in claim 1, wherein the ketone is beta methyl anthraquinone.

5. The device as defined in claim 1, wherein the ketone is quinizarine.

6. The device as defined in claim 1, wherein the ketone is 2-tertiary butyl anthraquinone.

References Cited in the file of this patent

UNITED STATES PATENTS

| | | |
|---|---|---|
| 2,377,689 | Hyde | June 5, 1945 |
| 2,384,384 | McGregor | Sept. 4, 1945 |
| 2,389,802 | McGregor | Nov. 27, 1945 |
| 2,389,804 | McGregor | Nov. 27, 1945 |
| 2,437,501 | Burkhard et al. | Mar. 9, 1948 |
| 2,465,296 | Swiss et al. | Mar. 22, 1949 |
| 2,588,436 | Violette | Mar. 11, 1952 |
| 2,802,017 | Frost | Aug. 6, 1957 |

FOREIGN PATENTS

| | | |
|---|---|---|
| 882,260 | Germany | Aug. 10, 1953 |

OTHER REFERENCES

"Stabilization of Chlorinated Diphenyl in Paper Capacitators," by Berberich Industrial and Engineering Chemistry, January 1948, pp. 117–123.

Sauer et al.: "Stabilization of Dielectrics, Operating Under Direct Current Potential," I. & E. Chem., vol. 44, No. 1, January 1952, pp. 135–140.